United States Patent
Kim et al.

(10) Patent No.: US 8,396,042 B2
(45) Date of Patent: Mar. 12, 2013

(54) MULTIPLE ACCESS SYSTEM AND METHOD FOR 60 GHZ WIRELESS COMMUNICATIONS SYSTEM

(75) Inventors: Kyeongpyo Kim, Daejeon (KR); Jin Kyeong Kim, Daejeon (KR); Woo Yong Lee, Daejeon (KR); Yong Sun Kim, Daejeon (KR); Nae-Soo Kim, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 948 days.

(21) Appl. No.: 12/479,424

(22) Filed: Jun. 5, 2009

(65) Prior Publication Data
US 2009/0238296 A1   Sep. 24, 2009

Related U.S. Application Data

(63) Continuation of application No. PCT/KR2007/004263, filed on Sep. 5, 2007.

(30) Foreign Application Priority Data

Dec. 7, 2006   (KR) .................. 10-2006-0124180

(51) Int. Cl.
*H04W 4/00* (2009.01)
*H04J 1/00* (2006.01)
*H04J 4/00* (2006.01)

(52) U.S. Cl. ........ 370/334; 370/330; 370/343; 370/436; 370/478; 370/481

(58) Field of Classification Search .......... 370/329, 370/330, 334, 343, 436, 478, 480, 481
See application file for complete search history.

(56) References Cited

U.S. PATENT DOCUMENTS

| 7,142,812 B1 | 11/2006 | Brankovic et al. |
| 2005/0176416 A1 | 8/2005 | Desch et al. |

FOREIGN PATENT DOCUMENTS

| KR | 102006007803 | 7/2006 |
| WO | WO-2006/078417 A2 | 7/2006 |

OTHER PUBLICATIONS

Wolniansky, P.W. et al., "V-BLAST: An Architecture for Realizing Very High Data Rates Over the Rich-Scattering Wireless Channel," *URSI International Symposium on Signals, Systems, and Electronics*, pp. 295-300 (1998).

*Primary Examiner* — Ronald Abelson
(74) *Attorney, Agent, or Firm* — Nelson Mullins Riley & Scarborough LLP; EuiHoon Lee, Esq.

(57) ABSTRACT

A control apparatus for use in wireless communications includes an antenna unit having antennas, the number of the antennas being equal to a maximum allowable number of connections in a specific frequency band; and a controller for receiving a connection request signal from each terminal attempting to connect to the control apparatus via the antenna unit, and transmitting and receiving a data signal to and from each terminal connected to the control apparatus by using a multiple-input-multiple-output scheme. The controller transmit and receive the data signal to and from each terminal connected to the control apparatus by obtaining a signal value of each antenna based on a predicted channel matrix and the number and types of terminals connected to the control apparatus via the antenna and separating the data signal for each terminal from the signal value according to the multiple-input-multiple-output scheme.

9 Claims, 2 Drawing Sheets

MULTIPLE ACCESS SYSTEM AND METHOD FOR 60 GHZ WIRELESS COMMUNICATIONS SYSTEM

RELATED APPLICATIONS

This application is a continuation application of PCT international application serial number PCT/KR2007/004263 filed on Sep. 5, 2007, which designates the United States and claims priority to, and the benefit of, Korean Patent Application No. 10-2006-0124180, filed on Dec. 7, 2006. The contents of the aforementioned application are hereby incorporated by reference.

FIELD OF THE INVENTION

The present invention relates to a multiple access system and method for a 60 GHz wireless communications system; and, more particularly, to a technique for allowing a number of terminals to connect and communicate with a single controller without compromising data rates when the terminals are wirelessly connected to the controller via an identical channel, i.e., an identical frequency band, for high speed data transmission.

BACKGROUND OF THE INVENTION

In general, when a number of terminals are wirelessly connected to a single controller, different channels are used for different terminals, thereby resulting the sum of the communications speed of each terminal to be constant. However, since each communications speed between each terminal and the controller decreases in inverse proportion to the number of the terminals, it is far from being high speed wireless communications in terminals' perspective.

SUMMARY OF THE INVENTION

It is, therefore, an object of the present invention to provide a multiple access system and method for a 60 GHz wireless communications system for allowing a number of terminals to connect and communicate with a single controller without compromising data rates when the terminals are wirelessly connected to the controller over an identical channel, i.e., an identical frequency band, for high speed data transmission.

In accordance with an aspect of the present invention, there is provided a control apparatus for use in wireless communications, the apparatus including:

an antenna unit having antennas, the number of the antennas being equal to a maximum allowable number of connections in a specific frequency band; and a controller for receiving a connection request signal from each terminal attempting to connect to the control apparatus via the antenna unit, and transmitting and receiving a data signal to and from each terminal connected to the control apparatus by using a multiple-input-multiple-output scheme, wherein the controller transmits and receives the data signal to and from each terminal connected to the control apparatus by obtaining a signal value of each antenna based on a predicted channel matrix and the number and types of terminals connected to the control apparatus via the antenna and separating the data signal for each terminal from the signal value according to the multiple-input-multiple-output scheme.

Preferably, the controller receives the connection request signal containing information on the terminal transmitting the connection request signal during only a contention period, while each terminal attempting to connect to the control apparatus repeatedly transmits the connection request signal during a specific period of time including the contention period. Further, the controller may check a total number and types of the terminals attempting to connect to the control apparatus and connected to the control apparatus by using the information, and based thereon, separate the data signal for each terminal.

Preferably, the contention period is a specific length of time during which the controller checks whether there is at least one terminal attempting to connect to the control apparatus.

Preferably, each terminal connected to the control apparatus transmits and receives the data signal to and from the control apparatus during only a data transmission period which is a specific length of time for use in data signal transmission between the control apparatus and each terminal connected to the control apparatus.

Preferably, the controller obtains the signal value received via each antenna by adding a noise matrix representing noise at the antennas to the channel matrix representing channels between the antennas and the terminals connected to the control apparatus via the antenna, and multiplying the channel matrix and the noise matrix by a weight matrix. Further, the controller may separate the data signal for each terminal from the signal value according to the multiple-input-multiple-output scheme by subtracting from the signal value a set of possible values of the data signals, and obtaining a variable which minimizes a square of the subtraction result.

In accordance with another aspect of the present invention, there is provided a multiple access method for wireless communications, the method including:

receiving, at a control apparatus having antennas, a connection request signal from each terminal attempting to connect to the control apparatus via the antennas in a specific frequency band, the number of the antennas being equal to a maximum allowable number of connections and the connection request signal containing information on the terminal transmitting the connection request signal;

checking, at the control apparatus, a total number and types of the terminals attempting to connect to the control apparatus and terminals already connected to the control apparatus by using the information contained the connection request signal;

obtaining, at the control apparatus based on the total number and types of the terminals attempting to connect to the control apparatus and already connected to the control apparatus, a signal value of each antenna by using a predicted channel matrix and the number and types of terminals connected to the control apparatus via the antenna;

separating, at the control apparatus, a data signal for each terminal from the signal value according to a multiple-input-multiple-output scheme; and transmitting and receiving, at the control apparatus, the data signal to and from each terminal connected to the control apparatus by using the multiple-input-multiple-output scheme.

Preferably, the control apparatus performs said receiving the connection request signal during a contention period only, the contention period being a specific length of time during which the control apparatus checks whether there is at least one terminal attempting to connect to the control apparatus.

Preferably, each terminal connected to the control apparatus does not transmit the data signal during the contention period, but transmits and receives the data signal to and from the control apparatus during a data transmission period only, the data transmission period being a specific length of time for use in data signal transmission between the control apparatus and each terminal connected to the control apparatus.

Preferably, said obtaining the signal value received via each antenna includes adding a noise matrix representing noise at the antennas to the channel matrix representing channels between the antennas and the terminals connected to the control apparatus via the antenna and multiplying the channel matrix and the noise matrix by a weight matrix. Further, said separating the data signal may include subtracting from the signal value a set of possible values of the data signals and obtaining a variable which minimizes a square of the subtraction result.

In accordance with the embodiments of the present invention, in a high speed data communications system using a 60 GHz frequency band, a number of terminals can simultaneously connect and communicate with one controller without degrading data rates like in a time division multiple access system, while the terminals are wirelessly connected to the controller over an identical channel, i.e., an identical frequency band, for high speed data transmission.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of a multiple access system and method for a 60 GHz wireless communications system of the present invention will be described in detail with reference to the accompanying drawings so that they can be readily implemented by those skilled in the art.

Figure 1:
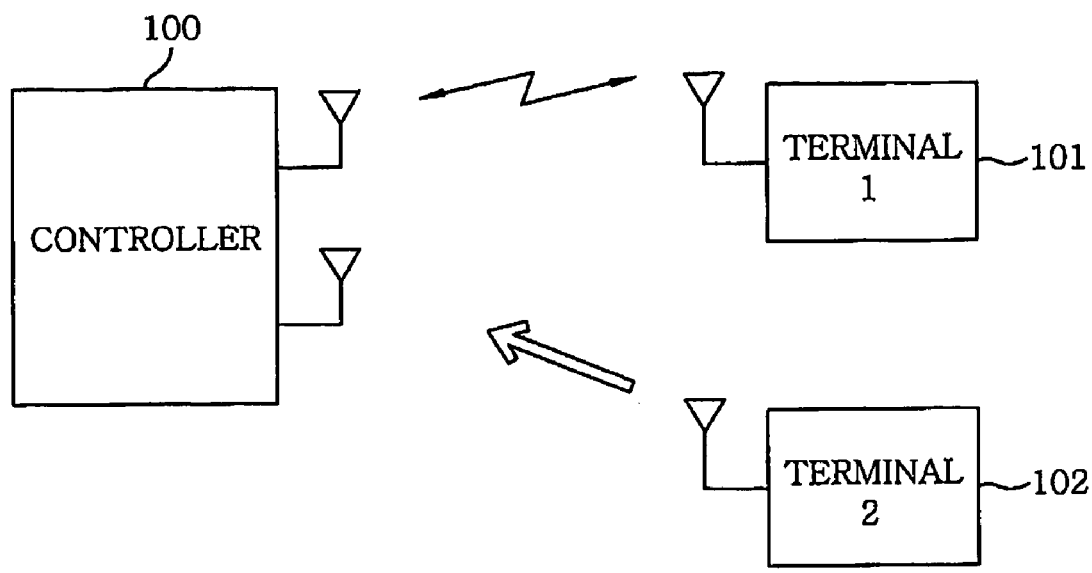
FIG. 1 is a configuration view showing a multiple access system in a state where one terminal is wirelessly connected to a controller and another terminal attempts to wirelessly connect to the controller.

FIG. 1 is a configuration view showing a multiple access system in a state where a first terminal 101 is wirelessly connected to a controller 100 and a second terminal 102 attempts to wirelessly connect to the controller 100.

The first terminal 101 already connected to the controller 100 does not transmit a data signal to the controller 100 during a contention period, but transmits a data signal only during a data transmission period. The contention period refers to a specific time period during which the controller 100 checks whether there are any additional terminals, e.g., the second terminal 102, which attempt to connect to the controller 100. Further, the data transmission period refers to a specific time period during which real data (data signals) are transmitted between the controller 100 and terminals already connected thereto, e.g., the first terminal 101. The second terminal 102 which attempts to connect to the controller 100 continuously transmits a connection request signal including therein its own information during a specific period of time including the contention period, and the controller 100 receives the connection request signal during the contention period to thereby know that there is an additional terminal attempting to connect to the controller 100. The controller 100 identifies the total number and types of terminals through this process, and then receives different data from each terminal by using more receive antennas than the terminals.

Figure 2:
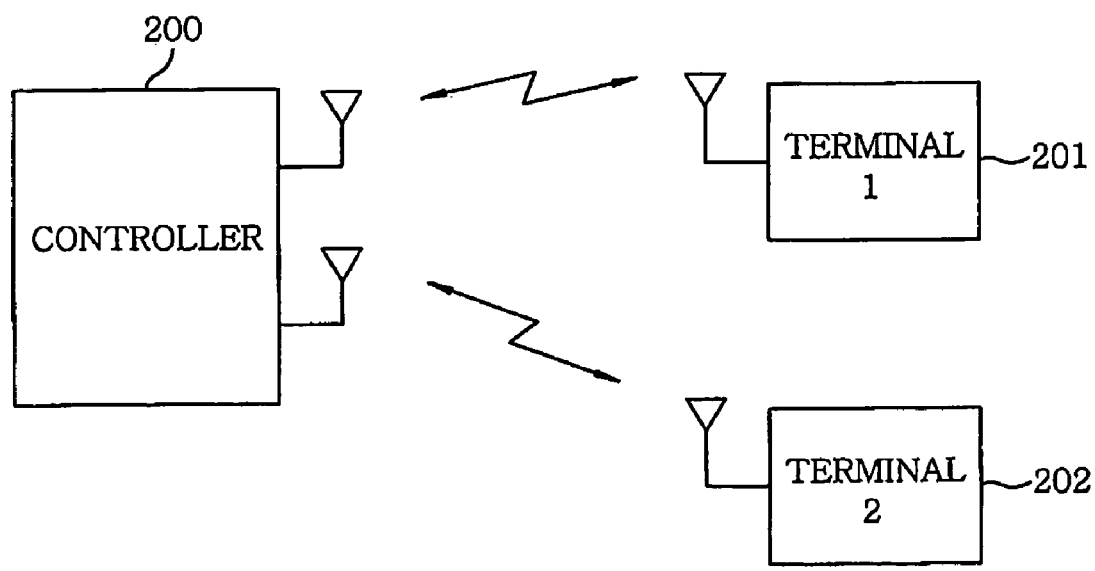
FIG. 2 illustrates a configuration view showing a multiple access system in a state where two or more terminals are wirelessly connected to a controller and the respective terminals transmits different data to the controller.

FIG. 2 illustrates a configuration view showing a multiple access system in a case where two terminals 201 and 202 are wirelessly connected to a controller 200 and transmit different data to the controller 200.

Although all transmit and receive antennas are directional antennas and 60 GHz signals have high directionality, the receive antennas of the controller 200 are disposed adjacent to each other, whereby it is difficult to separate different signals by beamforming techniques using a direction of the respective receive antennas or an antenna array. In such case, the controller 200 serving as a receiver uses receive antennas whose number is equal to or greater than the number of the terminals and employs various MIMO (Multiple Input Multiple Output) techniques such as ZF (Zero-Forcing), MMSE (Minimum Mean Squared Error), V-BLAST (Vertical Bell-Labs Layered Space-Time), ML (Maximum Likelihood) or the like to thereby separate each signal without decreasing the data rate.

For example, if N number of terminals are connected to a single controller which has M number of antennas (herein, in case of M>N), a separation process of each signal received from the terminals by the controller using the ZF or MMSE technique is described in the following. Here, $x_n$ indicates a signal transmitted to the controller by an $n_{th}$ terminal, and $y_m$ indicates a signal received by an $m_{th}$ antenna of the controller.

First, the signals received by the controller can be expressed by Equation 1.

$$\begin{bmatrix} y_1 \\ \vdots \\ y_m \\ \vdots \\ y_M \end{bmatrix} = H \begin{bmatrix} x_1 \\ \vdots \\ x_n \\ \vdots \\ x_N \end{bmatrix} + Z \qquad \text{Equation 1}$$

Herein, H is an M×N matrix representing channels from the N number of terminals to the M number of antennas of the controller, and Z is an M×1 matrix representing noise received by the antennas of the controller.

If the controller acquires the channel matrix by prediction, the weight matrix W by which the received signal matrix is multiplied can be represented as Equation 2-1 or 2-2.

$$W = (H^T H + \sigma_n I)^{-1} H^T \text{[MMSE]} \qquad \text{Equation 2-1}$$

$$W = (H^T H)^{-1} H^T \text{[ZF]} \qquad \text{Equation 2-2}$$

Here, $\sigma_n$ is a noise variance and I is an identity matrix.

Equation 3 describes the received signal matrix multiplied by the weight matrix W represented as Equation 2-1 or 2-2.

$$Y' = W \begin{bmatrix} y_1 \\ \vdots \\ y_m \\ \vdots \\ y_M \end{bmatrix} = WH \begin{bmatrix} x_1 \\ \vdots \\ x_n \\ \vdots \\ x_N \end{bmatrix} + WZ \qquad \text{Equation 3}$$

If $Y'=[w_1 \ldots w_n \ldots w_N]^T$ in Equation 3, the signal $x_n$ transmitted to the controller by the $n_{th}$ terminal can be expressed by Equation 4.

$$\hat{x}_n = \arg\min_s \left\| w_n \begin{bmatrix} y_1 \\ \vdots \\ y_m \\ \vdots \\ y_M \end{bmatrix} - s \right\|^2, s \in C^N \qquad \text{Equation 4}$$

In Equation 4, the $C^N$ is a set of possible values of the data transmitted from the terminals. In a similar manner, the MIMO techniques including V-BLAST, ML or the like can be used in the signal separation process.

Figure 3:
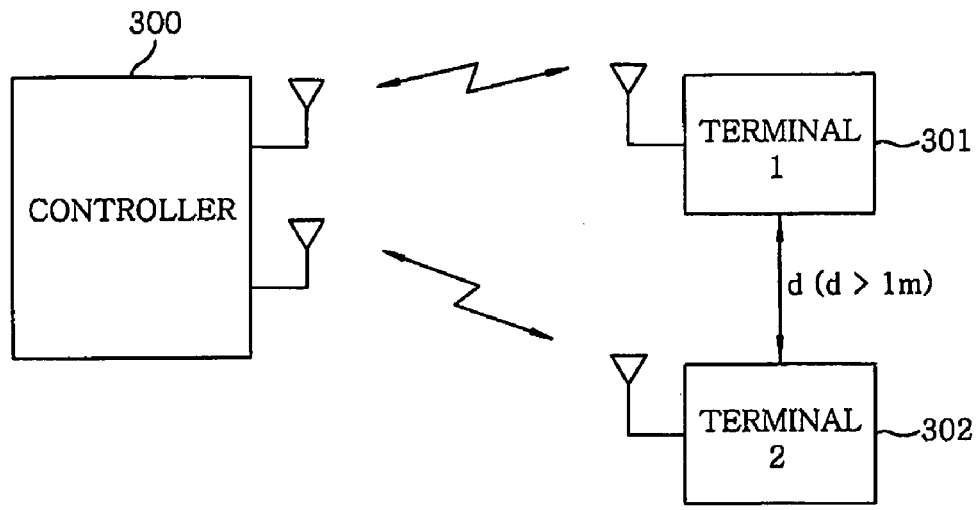
FIG. 3 illustrates a configuration view showing a multiple access system in a state where two or more terminals are wirelessly connected to a controller and the controller transmits different data to the terminals.

FIG. 3 illustrates a configuration view showing a multiple access system in a case where two terminals 301 and 302 are wirelessly connected to a controller 300 and the controller 300 transmits different data to the terminals 301 and 302.

In this case, a distance d between the terminals 301 and 302 is required to be high enough, e.g., d>1m, to prevent any mutual interferences between data signals transmitted respectively to terminals 301 and 302 from the controller 300. Since the 60 GHz signals have high directionality and low reflexibility, the controller 300 can transmit different data to the terminals 301 and 302 independently and in parallel through each antenna without being subject to interference by disposing each directional antenna to face a terminal to which data is transmitted therethrough. Therefore, the controller 300 can transmit data to a number of terminals without sacrificing a data rate, similar to the terminals in FIG. 2.

Figure 4:
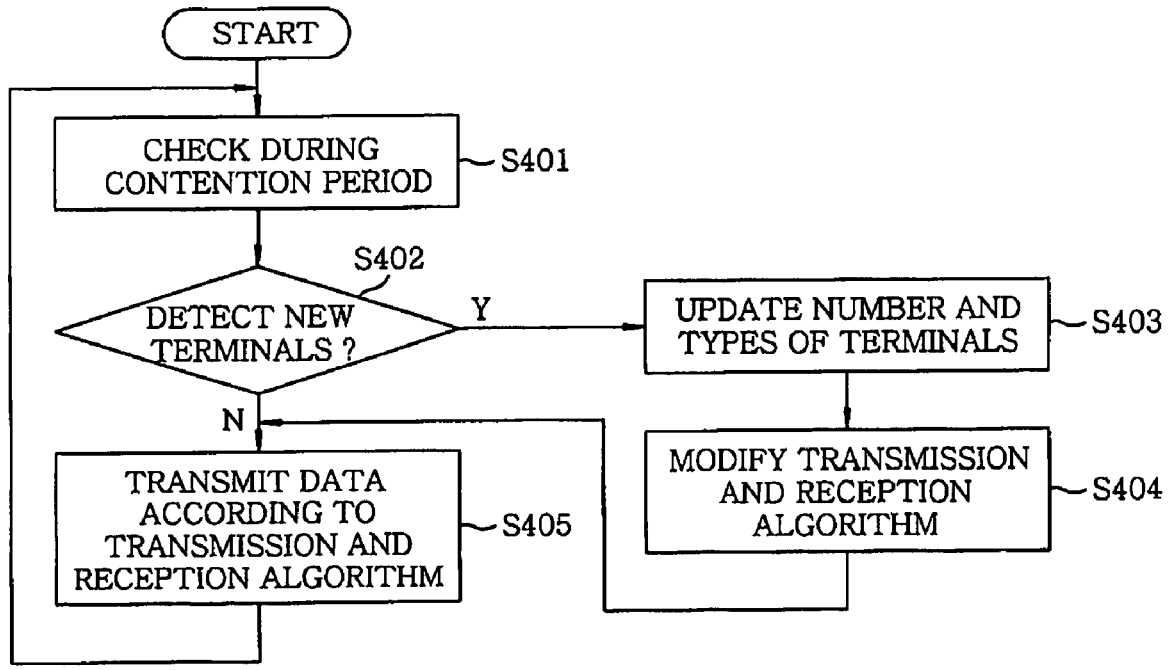
FIG. 4 is a flow chart for explaining a multiple access method using a 60 GHz wireless communications system in accordance with an embodiment of the present invention.

FIG. 4 is a flow chart for explaining a multiple access method using a 60 GHz wireless communications system in accordance with an embodiment of the present invention. The multiple access method of the present invention in a system having the above-described configuration includes following steps. First, a controller checks whether a connection request signal has been transmitted over 60 GHz frequency band from a terminal during the contention period (step S401). At this time, each terminal located within the communications range of the controller and attempting to connect to the controller continuously transmits a connection request signal including therein its own information during a specific period of time including the contention period in order to be connected to the controller, and the controller receives the connection request signal during the contention period to identify whether there is a terminal attempting to connect to the controller (step S402). If the controller detects terminals attempting to be connected to the controller in step S402, the controller checks the number and types of the terminals attempting to connect thereto, and then updates data containing the number and types of the terminals attempting to connect thereto and terminals already in connection (step S403).

After that, the controller modifies a transmission and reception algorithm based on the updated data (step S404) To be specific, having additional terminals connected to the controller, the controller modifies the transmission and reception algorithm based on the updated number of terminals and the updated types of the terminals. After the transmission and reception algorithm is modified, the controller simultaneously transmits and receives data to and from each terminal. Here, the terminals already connected to the controller do not transmit data signals during the contention period but transmit data signals only during the data transmission period.

If the controller does not detect any terminals attempting to connect thereto in step S402, it transmits and receives data to and from each terminal currently connected thereto according to the current transmission and reception algorithm (step S405).

Thereafter, the controller periodically checks whether a connection request signal has been transmitted from a terminal which is located around the controller and not connected thereto during the contention period.

Meanwhile, the above-described embodiments of the present invention can be written in a program executable on a computer, and implemented on a general-purpose digital computer which executes the program stored in a computer readable storage medium. As the computer readable storage medium, e.g., a magnetic medium such as a ROM, a floppy disk or a hard disk, an optical medium such as a CD-ROM or a DVD, and a storage medium such as a carrier wave transmitted through the internet may be used.

While the invention has been shown and described with respect to the embodiments, it will be understood by those skilled in the art that various changes and modifications may be made without departing from the scope of the invention as defined in the following claims.

What is claimed is:

1. A control apparatus for use in wireless communications, the apparatus comprising:
    an antenna unit having antennas, the number of the antennas being equal to a maximum allowable number of connections in a specific frequency band; and
    a controller for receiving a connection request signal from each terminal attempting to connect to the control apparatus via the antenna unit, transmitting a data for each terminal connected to the control apparatus and obtaining a data signal transmitted from each terminal connected to the control apparatus, by using a multiple-input-multiple-output scheme,
    wherein the controller transmits the data for each terminal connected to the control apparatus by calculating a signal to be transmitted via each antenna based on a channel matrix between the antennas and the terminals connected to the control apparatus and the number and types of the terminals connected to the control apparatus via the antennas, and
    wherein the controller obtains the data signal transmitted from each terminal connected to the control apparatus from a received signal of each antenna according to the multiple-input-multiple-output scheme.

2. The control apparatus of claim 1, wherein the controller receives the connection request signal containing information on the terminal transmitting the connection request signal during only a contention period, while each terminal attempting to connect to the control apparatus repeatedly transmits the connection request signal during a specific period of time including the contention period; and wherein the controller checks a total number and types of the terminals attempting to connect to the control apparatus and connected to the control apparatus by using the information, and based thereon, obtains data signals transmitted from the terminals attempting to connect to the control apparatus and the data signal transmitted from each terminal connected to the control apparatus.

3. The control apparatus of claim 2, wherein the contention period is a specific length of time during which the controller checks whether there is at least one terminal attempting to connect to the control apparatus.

4. The control apparatus of claim 2, wherein each terminal connected to the control apparatus transmits the data signal to the control apparatus and receives the data from the control apparatus during only a data transmission period which is different from the contention period.

5. The control apparatus of claim 1, wherein the controller obtains the data signal transmitted from each terminal connected to the control apparatus by multiplying the received signals of the antennas by a weight matrix which is based on the channel matrix, and by obtaining a variable which minimizes a square of a subtraction result calculated by subtracting a set of possible values of the data signals from the multiplied received signals.

6. A multiple access method for wireless communications, the method comprising:

receiving, at a control apparatus having antennas, a connection request signal from each terminal attempting to connect to the control apparatus via the antennas in a specific frequency band, the number of the antennas being equal to a maximum allowable number of connections and the connection request signal containing information on the terminal transmitting the connection request signal;

checking, at the control apparatus, a total number and types of the terminals attempting to connect to the control apparatus and terminals already connected to the control apparatus by using the information contained in the connection request signal;

calculating, at the control apparatus, a signal to be transmitted via each antenna based on a data for each terminal connected to the control apparatus, a channel matrix between the antennas and the terminals already connected to the control apparatus and the number and types of the terminals connected to the control apparatus via the antennas by using a multiple-input-multiple-output scheme; and obtaining, at the control apparatus, a data signal transmitted from each terminal connected to the control apparatus from a received signal of each antenna by using the multiple-input-multiple-output scheme.

7. The multiple access method of claim 6, wherein the control apparatus performs said receiving the connection request signal during a contention period only, the contention period being a specific length of time during which the control apparatus checks whether there is at least one terminal attempting to connect to the control apparatus.

8. The multiple access method of claim 7, wherein each terminal connected to the control apparatus does not transmit the data signal during the contention period, but transmits the data signal to the control apparatus and receives the data from the control apparatus during a data transmission period only, the data transmission period being different from the contention period.

9. The multiple access method of claim 6, wherein said obtaining the data signal transmitted from each terminal connected to the control apparatus includes multiplying the received signals of the antennas by a weight matrix which is based on the channel matrix, and by obtaining a variable which minimizes a square of a subtraction result calculated by subtracting a set of possible values of the data signals from the multiplied received signals.

\* \* \* \* \*